(12) United States Patent
Bueser et al.

(10) Patent No.: US 6,681,798 B2
(45) Date of Patent: Jan. 27, 2004

(54) PRESSURE REGULATOR

(75) Inventors: Wolfgang Bueser, Freiberg (DE); Dieter Schreckenberger, Marbach (DE); Tony Wheeler, Anderson, SC (US); Albert Gerhard, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/127,538

(22) Filed: Apr. 23, 2002

(65) Prior Publication Data

US 2003/0196702 A1 Oct. 23, 2003

(51) Int. Cl.⁷ .................... F16K 15/00; F02M 37/04
(52) U.S. Cl. .................... 137/539; 123/514; 251/337; 137/535
(58) Field of Search .................... 137/529, 535, 137/539; 123/510, 514; 251/337

(56) References Cited

U.S. PATENT DOCUMENTS

| | | | |
|---|---|---|---|
| 4,212,316 A | * 7/1980 | Basch et al. | 137/543.17 |
| 4,431,026 A | * 2/1984 | Fehrenbach et al. | 137/510 |
| 4,627,463 A | * 12/1986 | Johnstone | 137/510 |
| 5,564,397 A | 10/1996 | Kleppner et al. | |
| 5,655,503 A | * 8/1997 | Kampichler et al. | 123/510 |
| 5,775,894 A | * 7/1998 | Kosco, Jr. | 418/63 |
| 5,901,742 A | * 5/1999 | Kleppner et al. | 137/508 |

FOREIGN PATENT DOCUMENTS

| DE | 30 35 954 A1 | 5/1982 |
|---|---|---|
| EP | 1 090 657 A2 | 4/2001 |

* cited by examiner

*Primary Examiner*—John Rivell
*Assistant Examiner*—Ramesh Krishnamurthy
(74) *Attorney, Agent, or Firm*—Ronald E. Greigg

(57) ABSTRACT

The invention relates to a pressure regulator for a fuel injection system of an internal combustion engine, in which a pressure difference prevailing between a pressure inlet and a pressure outlet can be kept essentially constant by opening and closing at least one valve, which valve includes a valve closing member forced into the closing position against a valve seat by the action of a valve closing spring. The valve spring is formed by means of at least one pivotably supported valve leaf spring, and an arm, toward the valve seat in terms of the pivotable bearing means, of the valve leaf spring is braced on the valve closing member, and an arm of the valve leaf spring located on the side opposite the valve seat is braced on a support body, in such a way that a torque equilibrium prevails at the valve leaf spring.

16 Claims, 3 Drawing Sheets

PRESSURE REGULATOR

BACKGROUND OF THE INVENTION

1. Field of the Invention

The invention is based on a pressure regulator, in particular for a fuel injection system of an internal combustion engine, in which a pressure difference prevailing between a pressure inlet and a pressure outlet can be kept essentially constant by opening and closing at least one valve, which valve includes a valve closing member forced into the closing position against a valve seat by the action of a valve closing spring.

2. Description of the Prior Art

One pressure regulator of the type with which this invention is concerned, is known from European Patent Disclosure EP 0 198 381 A3, in which an elastic rubber diaphragm is retained between two housing halves of the pressure regulator and divides the housing into two chambers sealed off from one another. The diaphragm supports a cage that receives a valve ball associated with a valve seat. The valve seat is embodied on the end of a tube protruding into the lower housing half, which tube forms the pressure outlet of the pressure regulator. The cage is forced in the direction of the valve seat by a helical spring braced on the upper housing half. In addition, a further helical spring, braced on the cage, tenses the valve ball against the valve seat. Functioning as a pressure inlet is an opening, formed in the lower housing half, that communicates with a fuel pump. The upper chamber is subjected to the pressure prevailing in the air intake line of the internal combustion engine, by way of an opening in the upper housing half. When the fuel pump is put into operation, fuel is pumped via the pressure inlet into the lower housing half, and as a result of the pressure building up, the diaphragm is forced upward along with the cage, counter to the action of the helical spring; the valve ball is lifted from the valve seat and uncovers a flow cross section between the valve ball and the valve seat. If the pressure in the air intake line and thus also in the upper chamber changes, the diaphragm is moved upward or downward, causing the valve ball to move toward or away from the valve seat, which likewise causes a change in the flow cross section. The pressure difference that comes to be established between the pressure inlet and the pressure outlet should ideally change not at all or only slightly as a function of the volumetric fuel flow through the valve. To achieve this, the diaphragm must have a relatively large pressure-engagement area, which adversely affects the structural size of the pressure regulator. Moreover, there is the risk that over time the elastic membrane will tear or will no longer reliably perform its sealing function.

OBJECTS AND SUMMARY OF THE INVENTION

The pressure regulator of the invention has the advantage over the prior art that it makes do without a diaphragm and is therefore substantially smaller in size. In addition, it is more simply constructed as a typical pressure regulator and can therefore be produced more economically. Furthermore, the durability and reliability of a valve leaf spring are as a rule higher than those of a rubber diaphragm. The valve leaf spring is supported on the order of a rocker and is prestressed against the valve closing member by being braced on a support or clamping element. If a fluid pressure that generates a pressure force greater than the prestressing force acting on the valve closing member prevails at the pressure inlet, then the valve closing member lifts from the valve seat and uncovers a certain flow cross section, so that fluid can overflow to the pressure outlet. Because of the elastic properties of the leaf spring, the flow cross section can increase as the volumetric fluid flow increases, while the pressure difference between the pressure inlet and the pressure outlet changes only slightly, as in the pressure regulators of the prior art.

In accordance with a preferred embodiment, the valve leaf spring is pivotably connected to a pivot shaft, supported in a pressure regulator housing. The shaft has its axis disposed transversely to the length of the valve leaf spring and perpendicular to a plane that contains a center axis of the valve seat. A prestressing force generated by the support body can be transmitted as a closing force to the valve closing member by the valve leaf spring. The L-shaped cross section of the valve leaf spring makes for an especially compact design.

A further refinement provides that the support body is formed by a clamping leaf spring, which with its curved end is retained, in prestressed fashion, in the pressure regulator housing against the arm of the valve leaf spring located on the side opposite the valve seat. Because of the clamping leaf spring, additional spring-elastic resiliencies are present in the system, and the response behavior of the pressure regulator can therefore be still more sensitive, while pressure changes under conditions of a varying volumetric fluid flow are largely suppressed.

In a further, especially preferred provision, it can be provided that the valve ball can be retained with prestressing between a retainer leaf spring and the valve leaf spring; a ball segment of the valve ball, which segment is associated with the valve seat, protrudes through a through opening, oriented coaxially to a center axis of the valve seat, of the retainer leaf spring. As a result, the valve ball is durably retained between the two prestressed leaf springs, and in particular is retained in its opening position in a defined position relative to the valve seat. Furthermore, very high tightness and closing security are obtained; because the position of the valve ball is always stable, opening and closing positions of the valve body that are replicable at any time are assured for the pressure regulator of the invention. Since the valve leaf spring itself takes on some of the retention function of the valve ball, no additional components for guiding it are needed.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
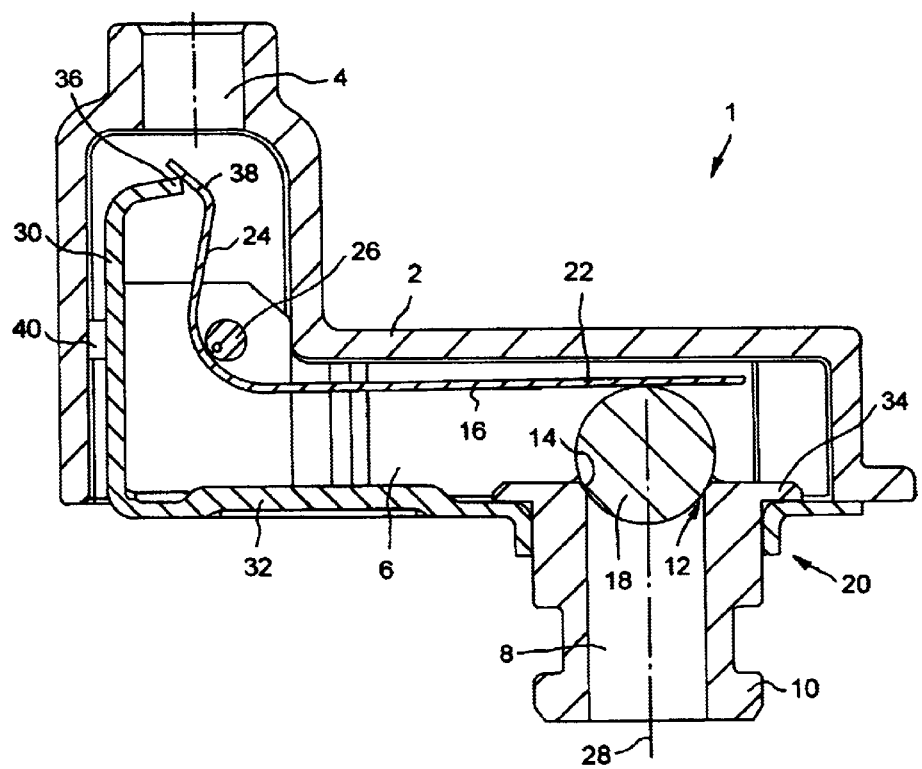
FIG. 1 is a cross-sectional view of a preferred exemplary embodiment of a pressure regulator with a valve leaf spring according to the invention.

The pressure regulator, identified overall by reference numeral 1 in FIG. 1 and shown there in a closing position, is secured, in a preferred embodiment, to a fuel pump, which is not shown for reasons of scale but is disposed in a fuel tank of a motor vehicle and serves to regulate the fuel pressure in the fuel system of a self-igniting internal combustion engine. The pressure regulator 1 has a housing 2 of L-shaped cross section, and in an upward-extending housing neck there is a pressure outlet opening 4, which connects an interior 6 of the housing 2 to the fuel tank. On the bottom, a connection piece 10 forming a pressure inlet 8 protrudes into the housing 2; it is connected to a pressure line, not shown, of the fuel system, and fuel flowing back from a fuel distributor flows through it.

Embodied on the end of the connection piece 10 is a valve seat 12, whose radially inner peripheral edge, as shown in FIG. 1, is provided with a chamfer 14, or alternatively can be embodied as a rectangular sealing edge. Instead of being embodied directly on the connection piece 10, the valve seat 12 can also be embodied on the housing 2; in that case, the housing 2 and the valve seat 12 are embodied for instance as an integral cast part machined by metal-cutting machining. The chamfer angle of the chamfer 14 is for instance in a range between 30 and 180°, and preferably it is about 60°. Because of the action of a valve spring 16 embodied as a leaf spring, a valve ball 18 embodied as a solid ball is forced against the valve seat 12. The valve leaf spring 16, valve ball 18 and valve seat 12 together form an overflow valve 20 of the pressure regulator 1. The valve ball 18 can comprise steel, ceramic or plastic; its diameter is preferably about 3 to 12 mm.

The valve leaf spring 16 preferably has an angular shape, comprising two arms 22, 24 extending essentially perpendicular to one another, and is pivotable about a pivot shaft 26, supported in the housing 2, that is transverse to the length of the valve leaf spring 16 and perpendicular to a plane containing a center axis 28 of the valve seat 12. The pivot shaft 26 furthermore extends in the region of an imaginary line where the two arms 22, 24 of the valve leaf spring 16 meet. The total length of the coiled valve leaf spring 16 is for instance 10 to 40 mm; its thickness is approximately 5 to 20 mm. The distance between the center axis 28 of the valve seat 12 and the pivot shaft 26 is preferably about 8 to 35 mm.

The arm 22, oriented toward the valve seat, of the valve leaf spring 16 is in contact at the top with the valve ball 18 and preferably extends perpendicular to the center axis 28 of the valve seat 12. A prestressing force, which on the arm 22 toward the valve seat generates a force that forces the valve ball 18 against the valve seat 12, engages the arm 24 of the valve leaf spring 16 located on the side or end portion opposite the valve seat 12, relative to the pivot shaft 26. This prestressing force is preferably generated by a clamping leaf spring 30, which forms a support body or clamping body and which extends essentially parallel to the arm 24, located on the side opposite the valve seat 12, of the valve leaf spring 16. The clamping leaf spring 30 is preferably embodied integrally with a cap 32 that closes the housing 2 of the pressure regulator 1 on the bottom and that in the assembled state is engaged from behind by a radially outer annular shoulder 34 of the connection piece 10 and protrudes perpendicularly away from the connection piece. The free end 36 of the clamping leaf spring 30 is curved toward the arm 24 of the valve leaf spring 16, located opposite the valve seat 12, and engages a rounded recess 38, formed on this arm, in such a way that a prestressing force generated by the clamping leaf spring 30 is introduced essentially perpendicular into the arm 24 of the valve leaf spring 16. The clamping leaf spring 30 is spaced apart from the housing 2 by a spacer 40 and as a result can be braced thereon. With its curved end 36, it exerts a torque on the pivotably supported valve leaf spring 16, by which torque the valve ball 18 is forced against the valve seat 12. The magnitude of the closing force, acting on the top as a reaction to the prestressing force of the clamping leaf spring 30 on the valve ball 18, depends on the selected lever ratios of the two arms 22, 24. A torque equilibrium then prevails at the valve leaf spring 16.

Figure 2:
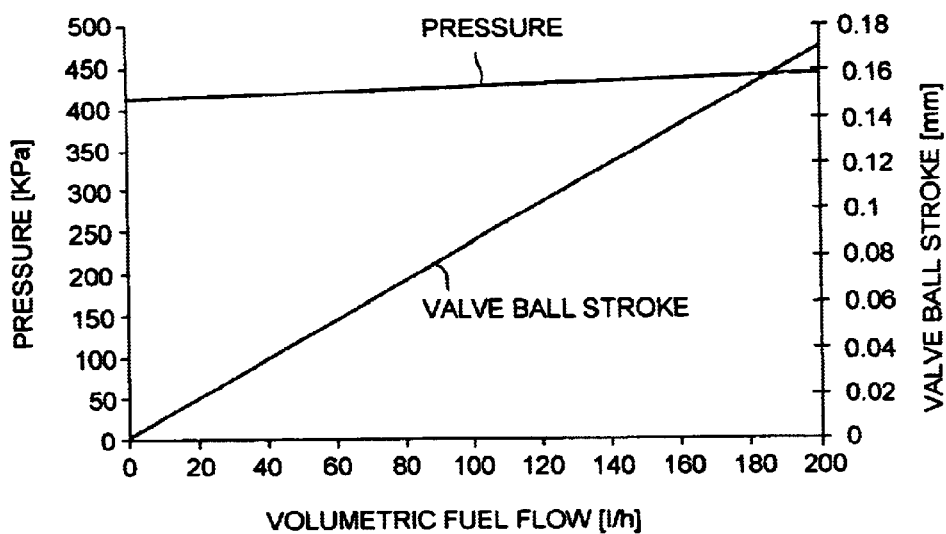
FIG. 2 is a graph showing the course of the pressure and of the valve ball stroke as a function of the volumetric fuel flow through the valve.
Figure 3:
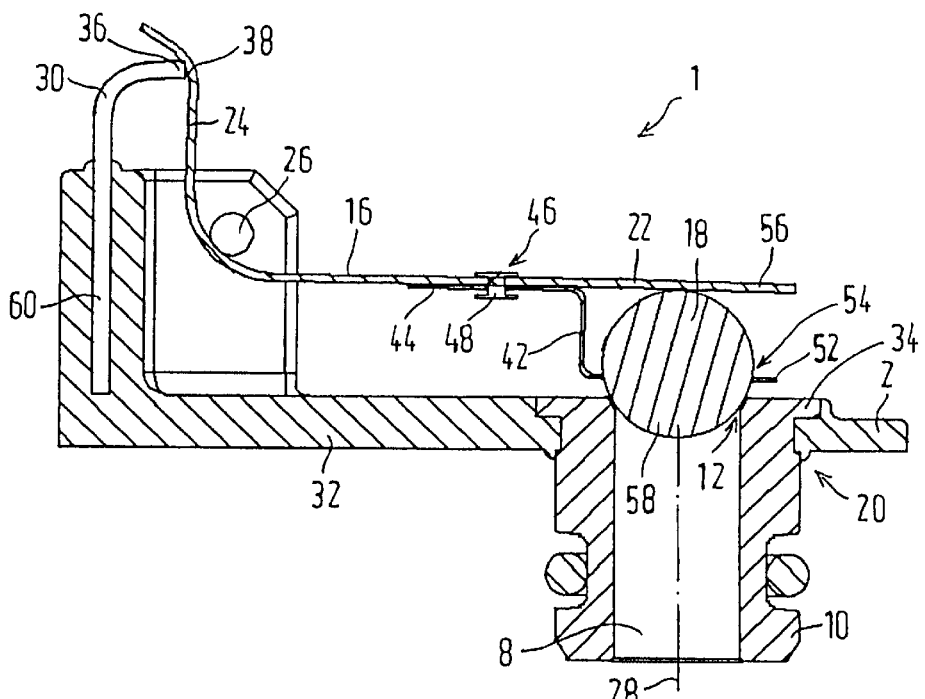
FIG. 3 is a cross-sectional view through a further exemplary embodiment, with a valve ball clamped between a valve leaf spring and a retainer leaf spring.
Figure 4:
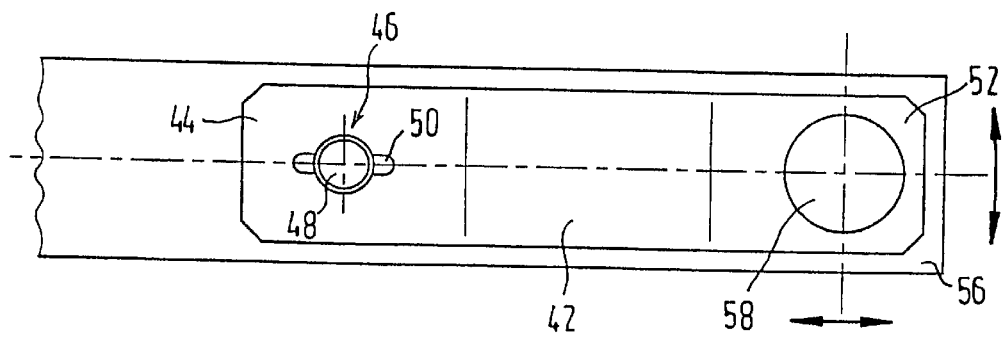
FIG. 4 is a view from below of the valve leaf spring of FIG. 3.

Against this background, the mode of operation of the pressure regulator 1 is as follows: If a fuel pressure high enough to generate a pressure force greater than the closing force acting on the valve ball prevails at the pressure inlet 8, then the valve ball 18 lifts from the valve seat 12 and uncovers a certain flow cross section, so that fuel can flow into the interior 6 of the housing 2 and from there to the pressure outlet 4. Because of the elastic properties of the leaf springs 16, 30, the flow cross section increases as the volumetric fuel flow increases. Experiments performed by the Applicant have shown that the pressure difference between the pressure inlet 8 and the pressure outlet 4 with an increasing volumetric fuel flow increases approximately linearly and with only a very slight upward slope, as the applicable curve in the graph in FIG. 2 shows. Thus the pressure course of the pressure regulator of the invention approaches the desired ideal course of constant pressure. The valve ball stroke is likewise in a linearly increasing relationship to the volumetric fuel flow, but with a greater upward slope. In the exemplary embodiment, the valve ball stroke is in a range from 0 to 0.25 mm.

In the other embodiments, shown in FIGS. 3–6, identical and analogously functioning components and groups of components are identified by the same reference numerals as in the preferred embodiment. Unlike the preferred embodiment, in the embodiment shown in FIG. 3 the valve ball 18 is retained in the coaxial position to the valve seat 12 by a valve ball retainer 42 that is also embodied as a leaf spring. The retainer leaf spring 42 has an offset-bent shape, for instance, and is secured by one end 44 to the arm 22, toward the valve seat, of the valve leaf spring 16, preferably by means of a riveted connection 46 having a rivet 48 that protrudes through an oblong slot 50, extending longitudinally, in the retainer leaf spring 42. The riveted connection 46 has little play of motion, so that the retainer leaf spring 42 can move rotationally and also, because of the oblong slot 50, translationally relative to the valve leaf spring 16 in a plane perpendicular to the center axis 28 of the valve seat 12, these motions being indicated by the arrows in FIG. 4.

The other or free end 52 of the retainer leaf spring 42 extends parallel to the arm 22, toward the valve seat, of the valve leaf spring 16 and ends essentially flush with arm 22. Moreover, the free end 52 of the retainer leaf spring 42 is provided with a preferably circular through opening 54, which has a smaller diameter than the valve ball 18 and is oriented coaxially to the center axis 28 of the valve seat 12. The through opening 54 could also be triangular or polygonal instead of circular; what is decisive is that the valve ball 18 cannot pass through it.

The valve ball 18 is then clamped, with prestressing and positive engagement, in an interstice between the free end 52 of the retainer leaf spring 42 and the free end 56 of the valve leaf spring 16 and is centered in the through opening 54, so that a ball segment 58 of the valve ball, associated with the valve seat 12, can come to rest, protruding through the through opening 54 of the retainer leaf spring 42, on the valve seat 12. Because there is play in the riveted connection 46, any axial deviations that may occur between the valve ball 18 and the valve seat 12 can be compensated for, as a result of which an always-central seat of the valve ball 18 is assured.

If the valve ball 18, because of the pressure and flow conditions in the connection piece 10, now lifts from the valve seat 12 into an opening position counter to the action of the valve leaf spring 16, the coaxial orientation of the valve ball 18 to the center axis 28 of the valve seat 12 is essentially preserved, on the one hand because the retainer leaf spring 42 that stabilizes this orientation is carried along with the valve leaf spring 16, and on the other because the clamping force exerted by the two leaf springs 16, 42 on the valve ball 18 is so great that the pressure force exerted by the fuel is not capable of forcing the valve ball 18 out of the through opening 54 of the retainer leaf spring 42. It is consequently always assured that the contact with the edge of the through opening 54 of the retainer leaf spring 42 that is necessary to fix the valve ball 18 positionally is maintained. The friction between the retainer leaf spring 42 and the arm 22, toward the valve seat, of the valve leaf spring 16 prevents unintentional pivoting of the retainer leaf spring 42 transversely to the center axis 28 while the valve ball 18 has lifted from the valve seat 12. Furthermore, the prestressing with which the valve ball 18 is clamped between the valve leaf spring 16 and the retainer leaf spring 42 generates a frictional-engagement fixation of the valve ball 18 in its position coaxial to the valve seat 12, a position that otherwise would be unstable because the retainer leaf spring 42 is movable relative to the valve leaf spring 16. Finally, the length of the arm 22, toward the valve seat, of the valve leaf spring 16 is great enough that the radial offset of the valve ball 18, which moves with the valve leaf spring 16 along an approximately circular path around the pivot shaft 26, is kept within limits, if the valve 20 is in the opening position. The clamping leaf spring 30 in this embodiment is a separate part, which is received in a vertical slot 60 in the bottom cap 32.

Figure 5:
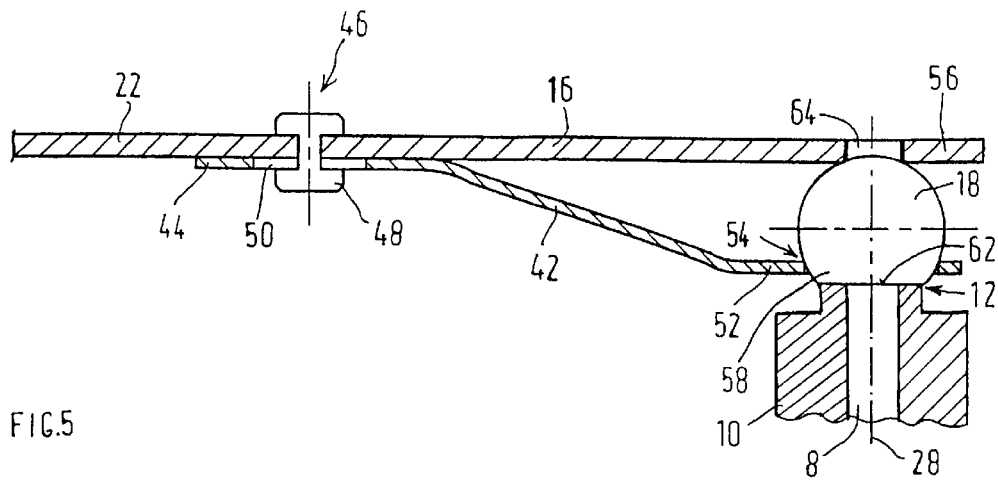
FIG. 5 is a cross-sectional view of a further exemplary embodiment, with a valve seat embodied as a flat seat.

In a further embodiment, shown in FIG. 5, the valve seat 12 is embodied as a flat seat, and the region associated with it of the valve ball 18 is formed by a flat sealing face 62 created by removal of part of the ball segment 58 protruding through the through opening 54 of the retainer leaf spring 42. This sealing face 62, in the closing position of the valve ball 18, is perpendicular to the center axis 28 of the valve seat 12 and is oriented coaxially with this center axis. In order to maintain the angular position and the orientation of the valve ball 18, the valve ball is received on the top end in an opening 64, coaxial with the center axis 28 of the valve seat 12, on the free end 56 of the valve leaf spring 16, which opening has a smaller cross section than the valve ball 18. Along with the prestressing operative between the valve leaf spring 16 and the retainer leaf spring 42, this then keeps the valve ball 18 in a stable position.

Figure 6:
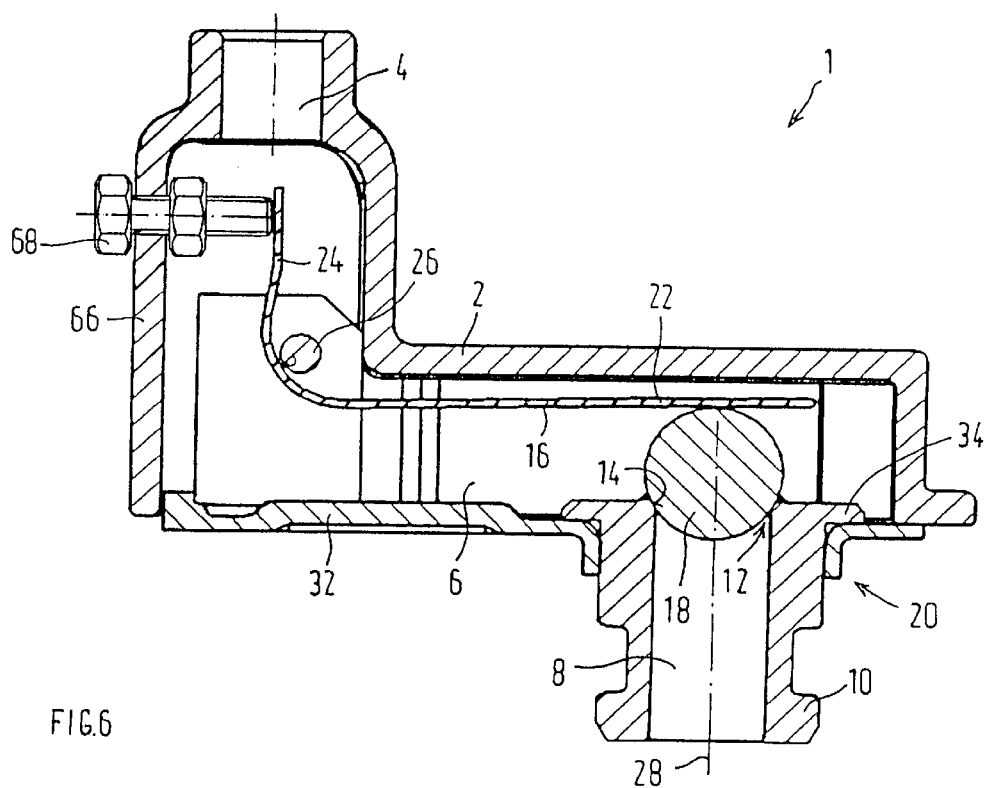
FIG. 6 is a cross-sectional view of a further exemplary embodiment, with a screw as the supporting and prestressing element.

In an embodiment shown in FIG. 6, the supporting or clamping body is formed by a screw 68, screwed into a female thread of the pressure regulator housing 2, the free end of which screw engages the arm 24, located on the side opposite the valve seat 12, of the valve leaf spring 16; the prestressing force acting on the arm 24 is adjustable as a function of the depth to which the screw 68 is screwed in. In the position shown in FIG. 6, the screw 68 is screwed all the way in, and thus the maximum prestressing force is established.

Instead of being disposed inside the fuel tank, the pressure regulator 1 of the invention can also be disposed outside the fuel tank, for instance in a fuel filter external to the tank. In that case, there is a return line, leading away from the pressure regulator, into the fuel tank. Also, it is understood that the pressure regulator 1 can be used as well in fuel systems of internal combustion engines with externally supplied ignition or in any other fluid-carrying system.

The foregoing relates to preferred exemplary embodiments of the invention, it being understood that other variants and embodiments thereof are possible within the spirit and scope of the invention, the latter being defined by the appended claims.

We claim:

1. A pressure regulator (1) for a fuel injection system of an internal combustion engine, in which a pressure difference prevailing between a pressure inlet (8) and a pressure outlet (4) can be kept essentially constant by opening and closing at least one valve (20), which valve includes a valve closing member (18) forced into the closing position against a valve seat (12) by the action of a valve closing spring (16), the improvement wherein the valve spring is formed by means of at least one pivotably supported valve leaf spring (16), and a first arm (22) of the valve leaf spring (16), oriented toward the valve seat in terms of the pivotable bearing means (26), is braced on the valve closing member (18), and a second arm (24) of the valve leaf spring (16) located on the side opposite the valve seat (12) is braced on a support body (30; 68), in such a way that a torque equilibrium prevails at the valve leaf spring (16).

2. The pressure regulator according to claim 1, characterized in that the valve leaf spring (16) is pivotably engages a pivot shaft (26), supported in a pressure regulator housing (2), the axis of the shaft (26) being disposed transversely to the length of the valve leaf spring (16) and perpendicular to a plane that contains a center axis (28) of the valve seat (12).

3. The pressure regulator according to claim 1, wherein a prestressing force generated by the support body (30; 68) can be transmitted as a closing force to the valve closing member (18) by the valve leaf spring (16).

4. The pressure regulator according to claim 2, wherein a prestressing force generated by the support body (30; 68) can be transmitted as a closing force to the valve closing member (18) by the valve leaf spring (16).

5. The pressure regulator according to claim 1, wherein both arms (22, 24) of the valve leaf spring (16) are disposed essentially perpendicular to one another, and the pivot shaft (26) extends in the region of a line where the arms (22, 24) meet.

6. The pressure regulator according to claim 1, wherein the support body is formed by a clamping leaf spring (30) having a curved end (36) with which it is retained, in prestressed fashion, in the pressure regulator housing (2) against the arm (24) of the valve leaf spring (16) located on the side opposite the valve seat (12).

7. The pressure regulator according to claim 5, wherein the support body is formed by a clamping leaf spring (30) having a curved end (36) with which it is retained, in prestressed fashion, in the pressure regulator housing (2) against the arm (24) of the valve leaf spring (16) located on the side opposite the valve seat (12).

8. The pressure regulator according to claim 6, wherein the clamping leaf spring (30) is embodied integrally with a cap (32) that closes the housing (2) on the bottom side.

9. The pressure regulator according to claim 1, wherein the support body is formed by a screw (68), screwed into a housing wall (66) of the pressure regulator housing (2), the free end of which screw engages the arm (24), located on the side opposite the valve seat (12), of the valve leaf spring (16), and the prestressing force acting on this arm is adjustable as a function of the depth to which the screw (68) is screwed in.

10. The pressure regulator according to claim 1, wherein the valve closing member is formed by a valve ball (18), which is retained in a defined positional relationship with the valve seat (12) by a valve ball holder (42).

11. The pressure regulator according to claim 10, wherein the valve ball (18) is clamped by positive engagement with prestressing between a retainer leaf spring (42) and the valve leaf spring (16).

12. The pressure regulator according to claim 11, wherein the valve ball (16) is retained between free ends (52, 56) of the valve leaf spring (16) and of the retainer leaf spring (42), which ends, at least in the region of the valve seat (12), are disposed parallel to one another and perpendicular to the center axis (28) of the valve seat, and the retainer leaf spring (42) has an offset-bent shape, and its other end (44) is secured to the valve leaf spring (16).

13. The pressure regulator according to claim 12, wherein, to compensate for axial deviations between the valve ball (18) and the valve seat (12), the other end (44) of the retainer leaf spring (42) is secured to the retainer leaf spring (42) with play of motion in a plane perpendicular to the center axis (28) of the valve seat (12).

14. The pressure regulator according to claim 13, wherein a ball segment (58), associated with the valve seat (12), of the valve ball (18) protrudes through a through opening (54) of the retainer leaf spring (42), which opening is oriented coaxially to a center axis (28) of the valve seat (12).

15. The pressure regulator according to claim 14, wherein the valve seat (12) is embodied as a flat seat, and the region associated with it of the valve ball (18) is formed by a flat sealing face (62) created by removing part of the ball segment (58) protruding through the through opening (54) of the retainer leaf spring (42), which sealing face is oriented perpendicular to the center axis (28) of the valve seat (12) and coaxially with it.

16. The pressure regulator according to claim 15, wherein, to maintain the orientation and angular position of the flat sealing face (62) relative to the valve seat (12), a ball segment of the valve ball (18) is received in an opening (64) in the valve leaf spring (16), which opening is aligned with the center axis (28) of the valve seat (12).

* * * * *